(12) United States Patent
Gieseke et al.

(10) Patent No.: US 6,221,122 B1
(45) Date of Patent: *Apr. 24, 2001

(54) FILTER ELEMENT AND METHODS

(75) Inventors: Steven Scott Gieseke, Richfield; Wayne R. W. Bishop, St. Louis Park, both of MN (US)

(73) Assignee: Donaldson Company, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,447

(22) Filed: Feb. 26, 1999

(51) Int. Cl.⁷ .................................................. B01D 29/07
(52) U.S. Cl. .............................. 55/500; 55/385.3; 55/502; 55/510; 55/511
(58) Field of Search .................. 55/500, 502, 510, 55/519, 511, 518, 529, 385.3, 491, 495, 501, 509

(56) References Cited

U.S. PATENT DOCUMENTS

| | | |
|---|---|---|
| 3,019,854 | 2/1962 | O'Bryant . |
| 3,209,917 | 10/1965 | Yelinek . |
| 3,676,242 | 7/1972 | Prentice . |
| 3,807,150 | 4/1974 | Maracle . |
| 3,831,765 * | 8/1974 | Flynn et al. ............................ 55/519 |
| 3,841,953 | 10/1974 | Lohkamp et al. . |
| 3,849,241 | 11/1974 | Butin et al. . |
| 3,878,014 | 4/1975 | Melead . |
| 4,322,231 | 3/1982 | Hilzendeger et al. . |
| 4,449,993 | 5/1984 | Bergeron . |
| 4,521,233 * | 6/1985 | Vossen .................................... 55/529 |
| 4,999,038 | 3/1991 | Lundberg . |
| 5,547,480 | 8/1996 | Coulonvaux . |
| 5,672,399 | 9/1997 | Kahlbaugh et al. . |
| 5,714,126 | 2/1998 | Frund . |
| 5,730,766 | 3/1998 | Clements . |
| 5,755,844 * | 5/1998 | Arai et al. ............................. 55/502 |
| 5,800,587 | 9/1998 | Kahlbaugh et al. . |
| 5,863,482 * | 1/1999 | Schlor et al. .......................... 55/502 |
| 5,893,945 * | 4/1999 | Hunsinger et al. ..................... 55/519 |
| 5,897,676 | 4/1999 | Engel et al. . |
| 5,902,361 * | 11/1999 | Pomplun et al. ....................... 55/502 |
| 5,958,097 * | 9/1999 | Schlor et al. .......................... 55/502 |

FOREIGN PATENT DOCUMENTS

| | | |
|---|---|---|
| 997684 | 9/1976 | (CA) . |
| 2155522 | 5/1973 | (DE) . |
| WO 99/47237 | 9/1999 | (WO) . |

* cited by examiner

*Primary Examiner*—David A. Simmons
*Assistant Examiner*—Minh-Chau T. Pham
(74) *Attorney, Agent, or Firm*—Merchant & Gould P.C.

(57) ABSTRACT

A filter element includes a frame construction and a region of media held by the frame construction. The region of media is oriented within the frame construction to remove at least some particulates from a gas stream passing therethrough. The region of media includes a skirted portion, wherein the skirted portion occupies a volume between the frame construction and a sealing surface of a duct, when the filter element is mounted within a duct. In preferred systems, the filter element may be used as a secondary element in the duct of an engine air intake or in a duct of an air cleaner housing. Methods of using and servicing filter elements are described herein.

18 Claims, 5 Drawing Sheets

FILTER ELEMENT AND METHODS

FIELD OF THE INVENTION

This disclosure relates to filters, filter constructions, and methods of filtering and servicing filters. In particular, this disclosure concerns filters for removing particulate materials from engine air intake streams.

BACKGROUND OF THE INVENTION

In general, air cleaner arrangements are utilized to filter combustion air intake streams for various engine applications, including for example, for vehicles and stationary engines. One typical approach has been to utilize a primary element to remove the bulk of particulates, and a secondary element, downstream of the primary element. The secondary element is used to catch larger particulate matter that may have, for one reason or another, made it past the primary filter element. For example, if the primary filter element fails, or becomes unsealed, the secondary element is oriented to protect the engine from any large particles and debris.

Further, in many types of systems, the primary filter element becomes loaded with particulates, and needs to be replaced. During the replacement process, particulate material and debris can fall off of the primary element and into the air intake duct of the engine. It is desirable to have a secondary element positioned to catch any of the particulates and debris that fall off of the primary element when it is being serviced and replaced.

A variety of air filter or gas filter arrangements have been developed for particulate removal. In general, however, continued improvements are sought.

SUMMARY OF THE DISCLOSURE

The disclosure describes a filter element including a frame construction and a region of media held by the frame construction. The region of media is oriented within the frame construction to remove at least some particulates from a gas stream passing therethrough. Preferably, the region of media includes a skirted portion. The skirted portion is preferably constructed and arranged to be sufficiently compressible to be foldable over an outer periphery of the frame construction.

Preferably, the region of media comprises noncylindrical, nonpleated media. For example, the region of media can comprise fibrous, nonwoven media.

In preferred applications, the filter element according to the disclosure can be used in systems including an engine with an air intake duct and an air filter arrangement for cleaning air being taken into the engine. The air filter arrangement can include a first, or primary filter element and a removable and replaceable second, or safety filter element mounted in the air intake duct downstream of the first filter element. Preferably, the second filter element includes a region of filter media having a skirted portion. The skirted portion is positioned between and against the air intake duct and a frame construction of the second filter element.

Methods of using and servicing a filter element according to the disclosure are described. For example, one method of servicing includes positioning a filter element according to constructions described herein into a duct, such that a skirted portion will be positioned between an outer periphery of the frame and an inner wall of the duct.

DETAILED DESCRIPTION

Figure 1:
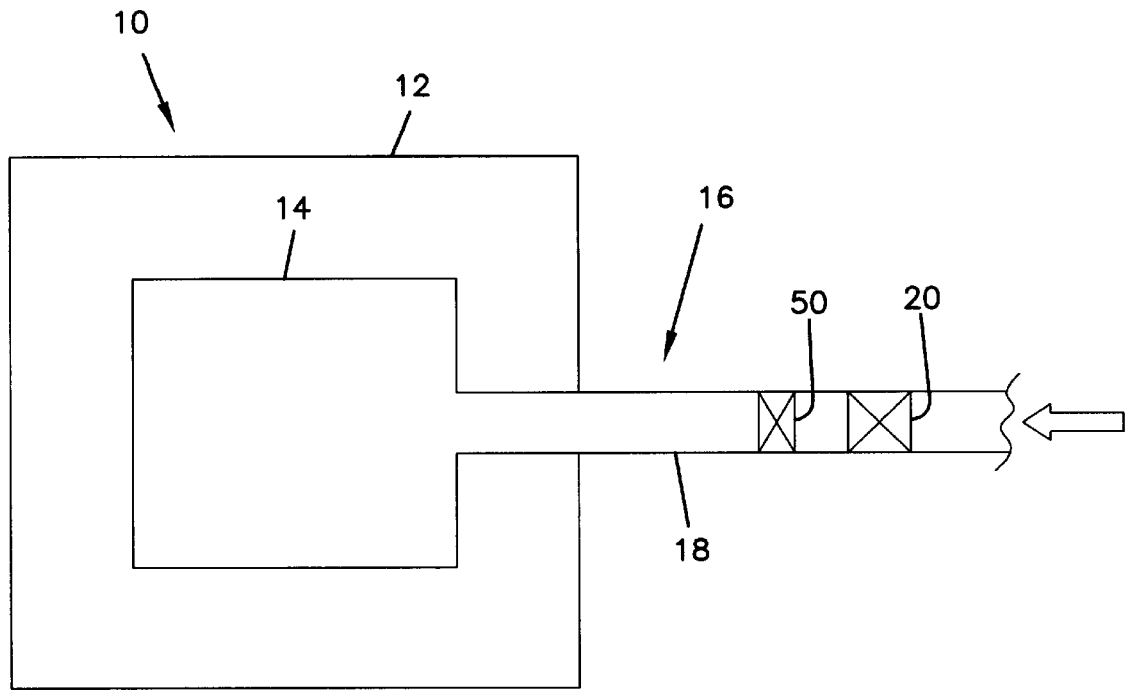
FIG. 1 is a schematic view of a system having an engine with an air intake system and a primary filter element and secondary element mounted within the air intake system.

A. FIG. 1, System of Use

The air cleaner arrangements and constructions disclosed herein are usable in a variety of systems. FIG. 1 depicts one particular system, shown schematically at 10. In FIG. 1, equipment 12, such as a vehicle, having an engine 14 with some defined rated airflow demand is shown schematically. Equipment 12 may comprise a bus, an over the highway truck, and off-road vehicle, a tractor, or marine application such as a powerboat. Engine 14 powers equipment 12, through the use of an air, fuel mixture. In FIG. 1, airflow is shown drawn into the engine 14 through an air intake system 16. The air intake system may include a duct 18, and air is taken into the duct 18 at arrow 22. A primary element 20 is shown upstream of the engine 14 to remove particles and contaminants from the air. Downstream of the primary filter element is a secondary element 50. The secondary element is also upstream of the engine 14 to remove any larger particles and contaminants that did not get removed by the primary element 20. Further, the secondary element 50 helps to protect the engine 14 from any particles or contaminants that may be knocked loose of the primary element 20, when the primary element 20 is being serviced.

B. FIGS. 2–7

Figure 2:
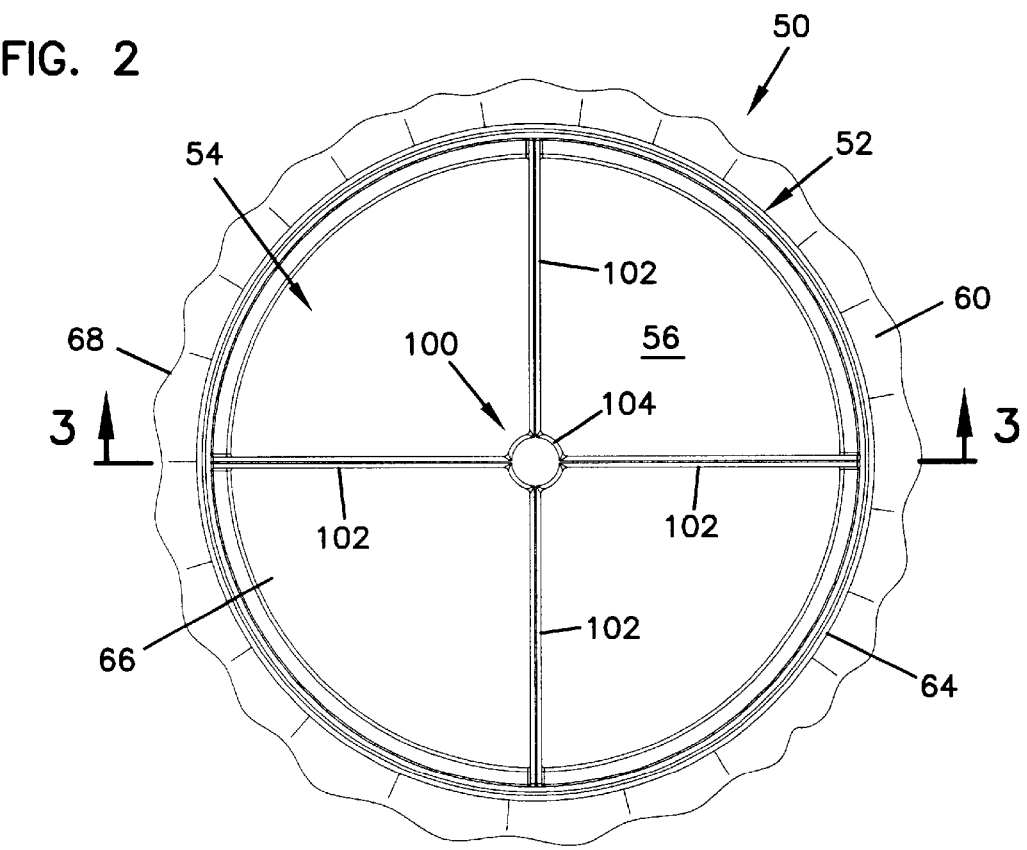
FIG. 2 is a top plan view of one embodiment of a filter element, that can be utilized as a secondary element in a system such as that shown in FIG. 1, according to principles of the disclosure.

Attention is directed to FIG. 2. FIG. 2 depicts a top plan view of a first embodiment of a filter element, such as the secondary element 50, shown in the system of FIG. 1. The filter element 50 can be used in the system 10 described above upstream from the engine 14 and downstream of an air cleaner or the primary filter element 20.

In general, the filter element 50 includes a frame construction 52 and a region of media 54. In preferred constructions, the frame construction 52 is usable for holding and supporting the region of media 54. Preferably, the media 54 is for removing at least some particulates from a gas stream (that is, particulates having a smallest outermost dimension that is larger than a largest pore size of the media 54). For example, the media 54 can be used to remove particulates from air being taken into the turbo of an engine.

In preferred systems, media 54 preferably is constructed and arranged to introduce little restriction into the air intake duct. For example, the filter element 50 including the media 54, in some arrangements, will have a restriction of no more than two inches of water, preferably no more than one inch of water.

The region of media 54 within the periphery of the frame construction 52, in the embodiment depicted in FIG. 2, is nonpleated and noncylindrical. Further, in the particular FIG. 2 embodiment, the region of media 54 is nonwoven and comprises not more than a single layer. The particular type of media 54 depicted in FIG. 2 includes a region of depth media, such as fibrous media.

When media 54 of the type depicted in FIG. 2 is assembled in the frame construction 52 depicted in FIG. 2, the media 54 will include a filtering portion 56 and a skirted portion 60. The filtering portion 56 will operate to remove contaminants and particulates having a size (i.e., smallest outermost dimension) greater than the pore size of the media 54 from an air or gas stream passing therethrough. For example, with certain types of media 54 described herein, the filtering portion 56 will remove about 50% of dust particles having an average particle size (smallest outermost dimension) of less than 1–10 microns passing therethrough.

The skirted portion 60 preferably operates to cooperate with an annular surface of a duct, or other constructions that the filter element 50 may be installed within, to occupy or fill a volume between the construction and the filter element 50 and create a "sealing effect". By the term "sealing effect", it is meant that high restriction is introduced in the volume between the periphery of the frame construction 52 and an inner wall portion of a duct; while some air or gas may be allowed to pass through the region between an outer periphery of the frame construction 52 and the annular surface of the duct, the air or gas that does pass through, for the most part, will pass through the media in the skirted portion 60. This is described further below, in connection with the description of FIG. 4.

Still in reference to FIG. 2, the particular frame construction 52 depicted in FIG. 2 includes an outer periphery 64. The outer periphery 64 defines a perimeter area 66 therewithin. In other words, in the specific configuration depicted in FIG. 2, the perimeter area 66 comprises the entire region within the outer periphery 64. The outer periphery 64 may have a variety of shapes. In the particular embodiment shown in FIG. 2, the outer periphery 64 is circular. In this particular embodiment of FIG. 2, the perimeter area 66 would include everything within the circular periphery, and can be calculated by squaring the radius of the circular outer periphery 64 and multiplying it by pi (π).

When constructed in the way shown in FIG. 2, the filtering portion 56 occupies or fills the entire perimeter area 66. When cleaning a gas stream passing therethrough, by occupying the entire perimeter area 66, there are no regions of unfiltered areas that the gas stream may escape through. As can also be seen in FIG. 2, preferably the skirted portion 60 extends outside of the outer periphery 64 and is not part of the perimeter area 66. In the particular arrangement shown in FIG. 2, the skirted portion 60 extends both outside and radially beyond the outer periphery 64. In FIG. 2, it can be seen that the media 54 includes an outermost edge or periphery at 68. This outermost edge 68 is spaced from the outer periphery 64, when the filter element 50 is not installed in a duct or tubular construction.

Figure 3:
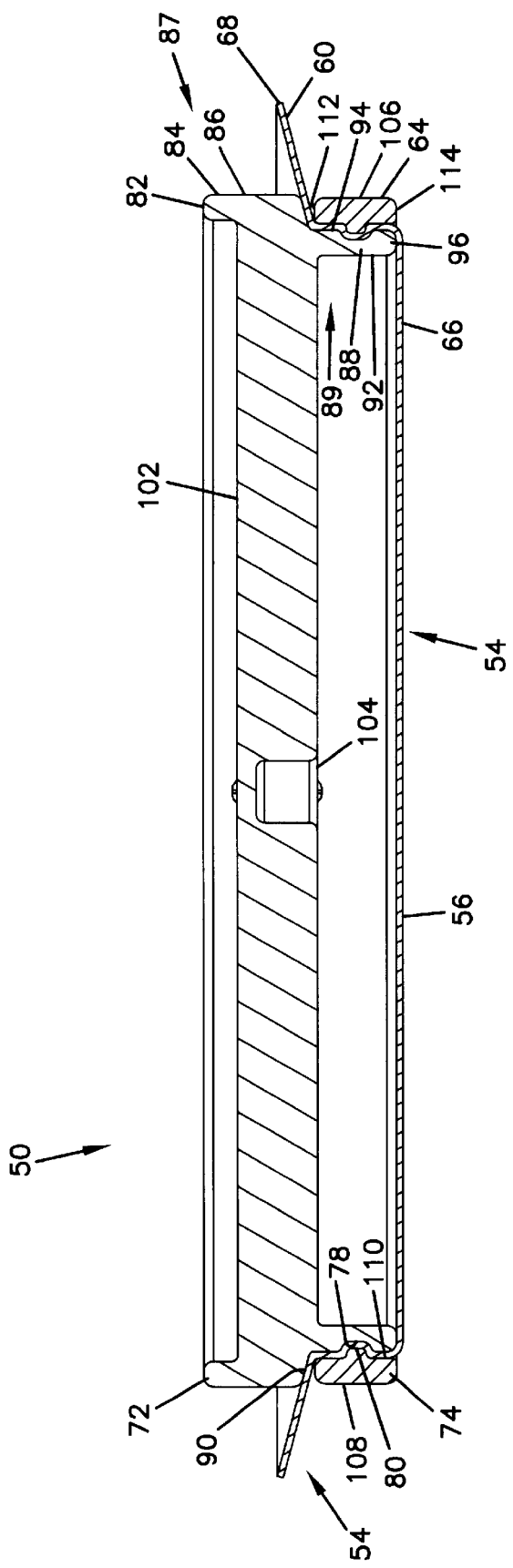
FIG. 3 is a cross-sectional view of the filter element depicted in FIG. 2 and taken along the line 3—3 of FIG. 2.

In some preferred constructions, the frame construction 52 is a multi-piece construction. Attention is directed to FIG. 3. In the particular arrangement depicted in FIG. 3, the frame construction 52 is a two-piece construction. In the particular FIG. 3 embodiment, the filter construction 52 includes first and second frame pieces 72, 74. The first and second frame pieces 72, 74 preferably are constructed and arranged to hold the media 54 within a duct or tubular construction, while providing sufficient structural integrity to prevent collapse under air pressure.

Figure 4:
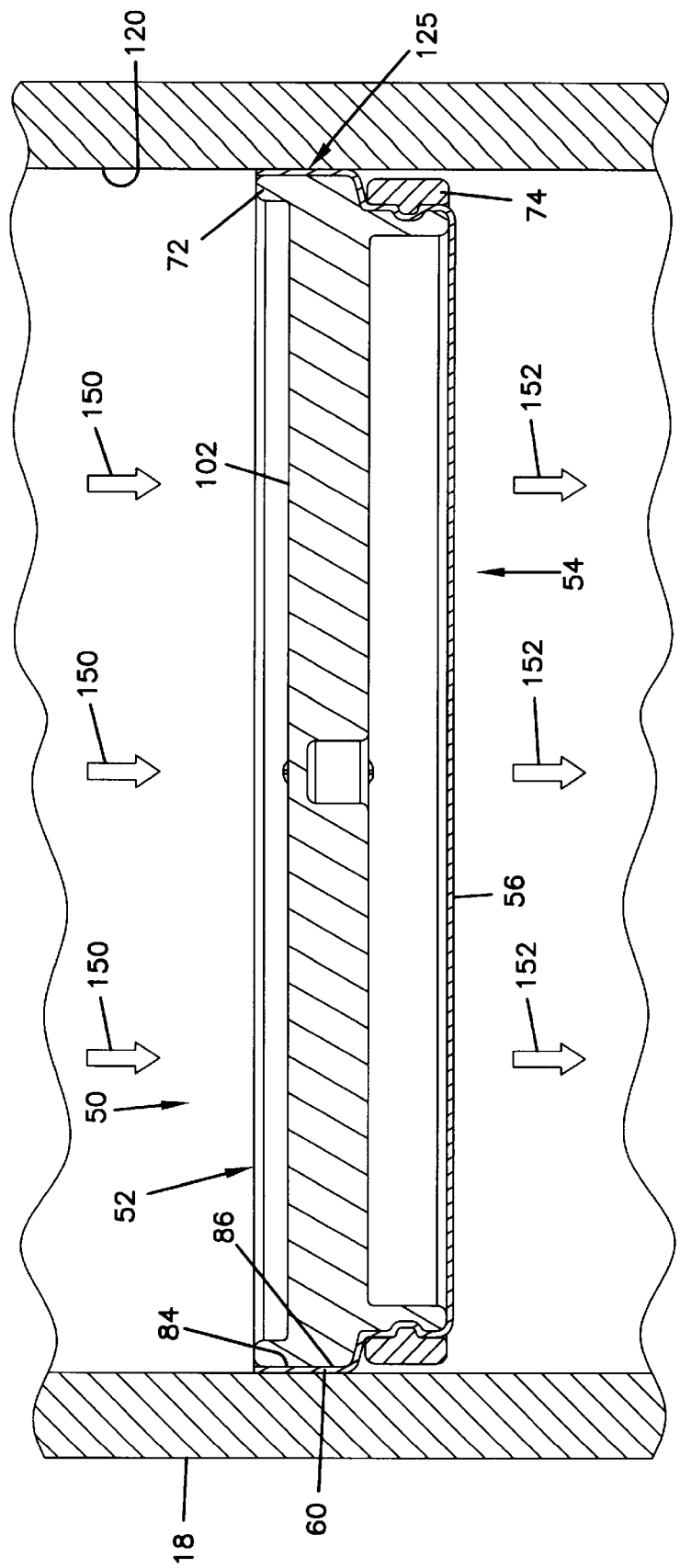
FIG. 4 is a cross-sectional view of the filter element of FIG. 2 and installed and sealed within a duct of an air intake system.
Figure 7:
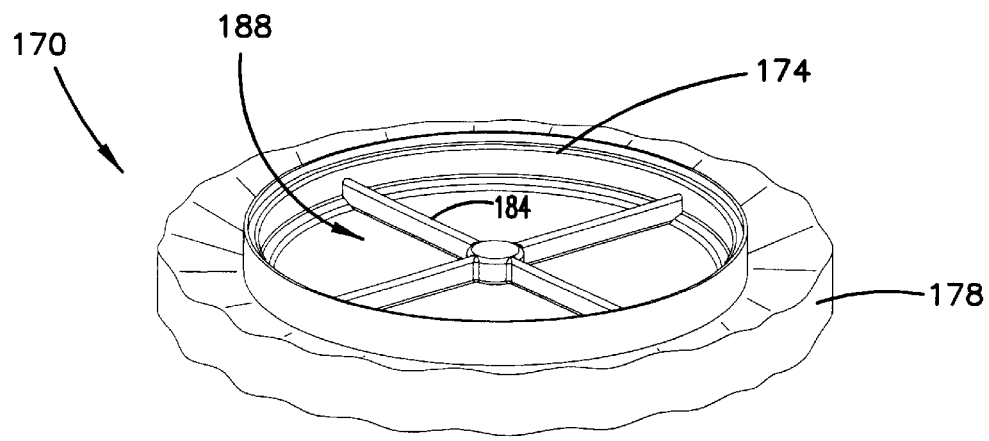
FIG. 7 is a perspective view of the filter element depicted in FIG. 6, but assembled.

Still in reference to FIG. 3, it should be noted that the skirted portion 60 depicted in FIG. 3, for the sake of clarity and simplicity, is depicted in a compressed state. In many preferred constructions, the media in the skirted portion 60 will have greater thickness when not compressed within a duct. After insertion into a duct, the skirted portion 60 preferably will be compressed to a thinness as illustrated in FIGS. 3 and 4. An example of a skirted portion with uncompressed media, prior to insertion into a duct, is depicted in FIG. 7.

When a multi-piece frame is used, there will include structure or a construction holding the multiple pieces together, with the media 54. In the particular illustrated arrangement, the first and second frame pieces 72, 74 include a locking arrangement 76, constructed and arranged to permit the first and second pieces 72, 74 to lock, or fit, or snap, or matably engage together. In preferred arrangements, the locking construction or arrangement 76 holds the region of media 54 between the first and second frame pieces 72, 74 to securely hold the media 54 in place and under sufficient tension in order to minimize the restriction through the media 54.

A variety of locking arrangements 76 may be implemented. In the particular construction illustrated, the locking arrangement 76 includes a bead and recess system. That is, preferably, at least one of the first and second frame pieces 72, 74 has a projection, such as a bead, while the other of the first and second frame pieces 72, 74 has a cooperating recess or indent for receiving the bead. In the particular illustrated embodiment depicted in FIG. 3, the first frame piece 72 defines a recessed portion 78, while the second frame piece 74 defines a projection or bead member 80 for projecting or snapping therein.

In some arrangements, the first frame piece 72 will have a cross-section that is preferably the same shape as the cross-section of the duct or tubular construction that the filter element 50 will be mounted in. In the particular embodiment shown in FIG. 3, the first frame piece 72 has a circular cross-section. The first frame piece 72 may be constructed for convenient manufacturing techniques, such as injection molding. In the particular embodiment shown in FIG. 3, the first frame piece 72 includes an uppermost rim 82 that would correspond to the side of the filter element 50 that is most upstream. Immediately adjacent to the uppermost rim 82 is preferably a planar region 84 defining an annular sealing support 86. As will be described further below, the annual sealing support 86 defines a wall or support structure between and against which a sealing effect may be formed by the skirted portion 60 with a duct or tubular construction.

Still in reference to the particular illustrated embodiment of FIG. 3, the uppermost rim 82 and planar region 84 form a region of first periphery, in this case, diameter. Adjacent and downstream thereof is a second region of periphery, or in this case, diameter. The second region includes an extension 88 having a diameter smaller than the first region of the uppermost rim 82 and planar region 84. Because of the differences in diameter, there is a shoulder or step 90 between the first and second regions 87, 89. The extension 88 comprises a locking member for cooperating with the second frame piece 74. In particular, the extension 88 includes an internal radial wall or surface 92 and an opposite, external surface or wall 94. This external wall 94 preferably defines the indent or recessed portion 78. As can be seen in FIG. 3, preferably the recessed portion has an arcuate cross-section. The recessed portion 78 is spaced from an end tip 96 and the step or shoulder 90.

In certain preferred arrangements, the frame construction 52 will include a handle system for permitting the convenient installation and removal of the filter element 50 from a duct or tubular construction. Many different types of handle systems may be implemented. One particularly preferred embodiment of a handle system is illustrated in FIG. 2. In the particular FIG. 2 embodiment, the first frame piece 72 includes a handle construction 100. While a variety of constructions are contemplated herein, in the embodiment shown in FIGS. 2 and 3, the handle construction 100 includes a plurality of ribs 102 radially extending from the first region 87 of the first frame piece 72. In the embodiment shown, the ribs 102 intersect at a center frame member 104. The ribs 102 and center frame member 104 provide structure for a user to grasp when handling the filter element 50, for example when changing out the filter element 50.

In certain preferred constructions, the handle construction 100 including the ribs 102 and center frame member 104 also provide support structure to the frame construction 52. Again, the frame construction 52 should have sufficient structural integrity to prevent collapse under air intake pressures, that can typically range from at least 25 in. of water, and can be up to 100 inches of water.

In certain arrangements, the second frame piece 74 will have a cross-sectional shape that is the same as the first frame piece 72 and the duct or tubular construction. In the embodiment depicted in FIG. 3, the second frame piece 74 has a circular cross-section such that it can matably engage the circular cross-section of the first frame piece 72. The second frame piece 74 can include many different structural configurations. In the particular embodiment illustrated in FIG. 3, the second frame piece 74 includes an extension or band 106 with a periphery, in this case, diameter, that is less than the diameter of the first region 87 of the first frame piece 72. The band 106 includes an outer wall 108 and an opposite, inner wall 110. The band 106 also includes opposite end portions 112, 114. Spaced between the end portions 112, 114 along the inner wall 110 is the bead member 80. Bead member 80 preferably comprises a projection or extension projecting radially inwardly and toward the extension 88 of the second frame piece 74, when the first and second frame pieces 72, 74 are attached together. As can be seen in FIG. 3, preferably the bead member 80 defines a cross-section having a negative shape of the cross-section of the recessed portion 78. In this case, the bead member 80 has an arcuate cross-section.

The inner wall 110 of the second frame piece 74 defines a diameter that is somewhat larger than the diameter of the external wall 94 of the first frame piece 72. In this manner, the first and second frame pieces may be locked or snapped together with the bead member 80 resting in the recessed portion 78. The innermost diameter of the bead member 80 preferably is smaller than the outermost diameter of the recessed portion 78 to provide a good, secure interference fit or attachment or lock therebetween.

Still referring to FIG. 3, note that the axial length of the band 106 is such that the most upstream end portion 112 is located adjacent to the step 90, while the downstream end portion 114 is located generally aligned with the tip 96.

When the construction depicted in the FIGS. is used, the media 54 is held by the frame construction 52 by way of compression and mechanical locking between the first and second frame pieces 72, 74. FIG. 3 depicts one particular implementation. In FIG. 3, the media 54 is compressed between the external wall 94 of the extension 88 and the inner wall 100 of the band 106, including between the bead member 80 and recessed portion 78. Further, it can be seen that the media is pinched between the end portion 112 and step 90. Preferably, the compressing of the media between the first and second frame pieces 72, 74 is typically about 80–90%.

Attention is directed to FIG. 4. In FIG. 4, the filter element 50 is depicted installed in a tubular construction, such as the air intake duct 18, FIG. 1 or installed in an air cleaner housing. A tubular construction, such as intake duct 18 will typically include an inner wall 120, which will form an annular sealing effect surface with the filter element 50. As can be seen in FIG. 4, the skirted portion 60 of the media 54 is preferably constructed and arranged to be sufficiently compressible to be compressed between the frame construction 52 and the inner wall 120 of the duct 18. When sufficiently compressed between the frame construction 52 and inner wall 120, a sealing effect 125 or media-stuffed volume or media-filled region is formed for the filter element 50 with the duct 18. Specifically, the sealing effect 125 or media-occupied volume or media-filled region is formed between the filter element 50 and the inner wall 120. In the particular embodiment shown in FIG. 4, the sealing effect 125 or media-filled region is formed by compressing the skirted portion 60 of the media 54 between and against the frame construction 52 and the inner wall 120. In particular, the planar region 84 of the first frame piece 72 forms the annular support 86 against which the skirted portion 60 of the media 54 compresses.

In certain arrangements, the sealing effect 125 or media-filled region or media-occupied volume extends an axial length about equal to the axial length of the annular support 86 of the first frame piece 72. In some systems, this axial extension is at least 0.1 in., and typically about 0.25–1.0 in., and in some applications is about 0.4–0.6 in.

The compression of the media 54 at the skirted portion 60, in preferred systems, will be preferably sufficient to form the sealing effect 125 under pressures of up to 100 in. of water, and light enough to permit convenient and easy change out by hand. Preferably, the compression of the skirted portion 60 to form the media-occupied volume or region is at least 70%, preferably no greater than 90%, and typically between 75–85%. In preferred systems, the sealing effect 125 can be created by applying typically under 5 pounds of force, and ranging between 1–20 pounds.

Figure 5:
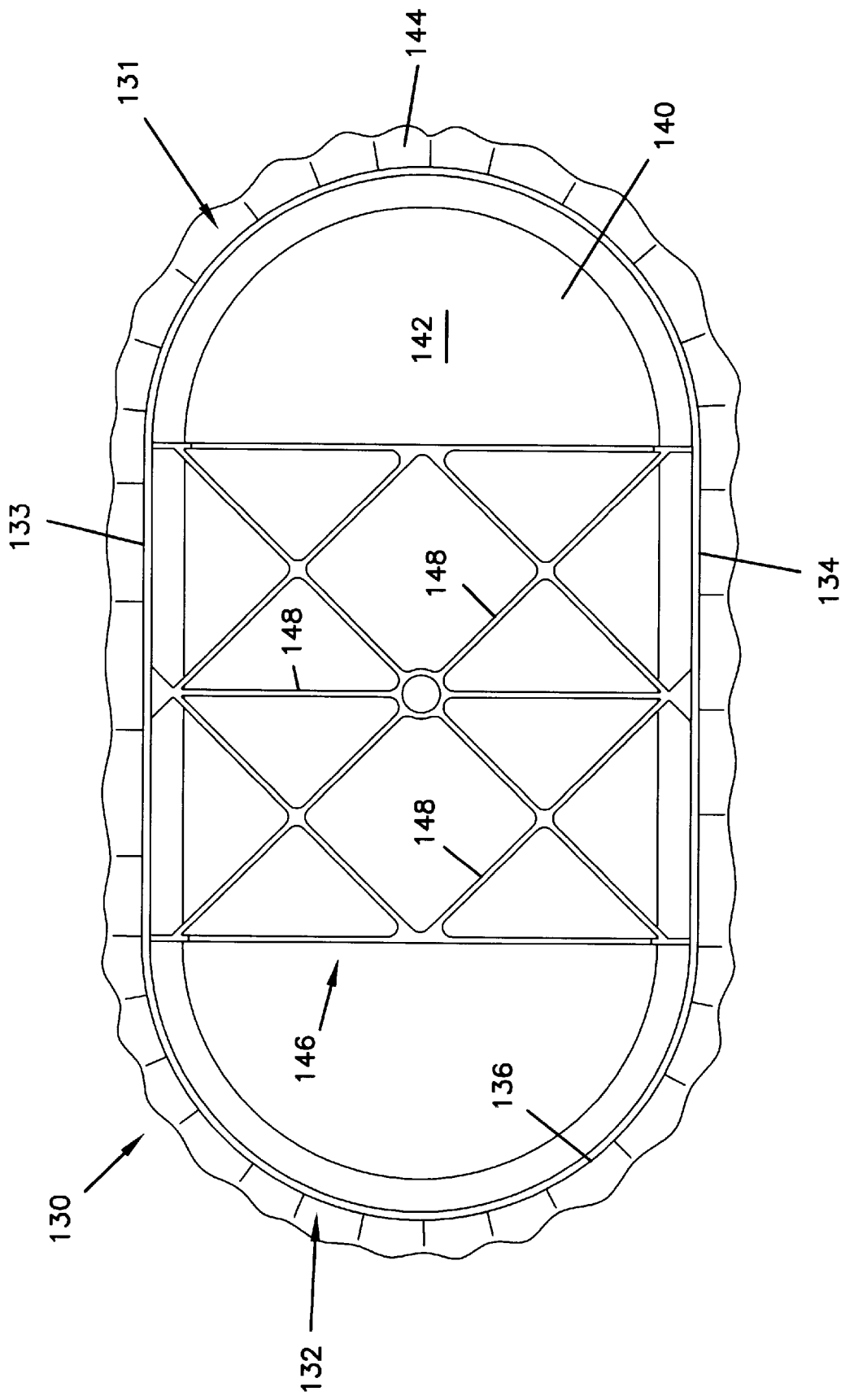
FIG. 5 is a top plan view of another embodiment of a filter element, analogous to the view shown in FIG. 2, according to principles of the disclosure.

Attention is directed to FIG. 5. FIG. 5 illustrates an alternate embodiment of a filter element at 130. The filter element 130 is analogous to the filter element 50 depicted in FIG. 2, but includes an alternate cross-sectional shape, shown in plan view in FIG. 5. Instead of the circular cross-section of FIG. 2, the filter element 130 of FIG. 5 has a non-circular configuration, for example, obround or "race track" shape. The filter element 130 includes first and second arcuate (or curved), preferably, semicircular ends 131, 132 joined by straight segments 133, 134. The filter element 130 includes a two piece frame construction 136 analogous to that described above for FIGS. 2–4. Similarly, the filter element 130 has a region of media 140 with a filtering portion 142 and a skirted portion 144. The frame construction 136 includes a support assembly 146 for providing resistance to pressure differentials in order to maintain the integrity of the sealing effect formed by the skirted portion 144 against the frame 136. In the example illustrated, the support assembly 146 includes a framework of rigid members 148 extending between the segments 133, 134. In preferred embodiments, the members 148 are molded as an integral part of the frame construction 136.

The filter element 130 would be usable in systems such as system 10 that includes non-circular duct work or non-circular tubular constructions. The skirted portion 144 would be compressed between and against the duct and the frame construction 136 to form a media-occupied region and sealing effect between the element 130 and duct. As such, the element 130 would have principles of operation analogous to those described above and further below.

Figure 6:
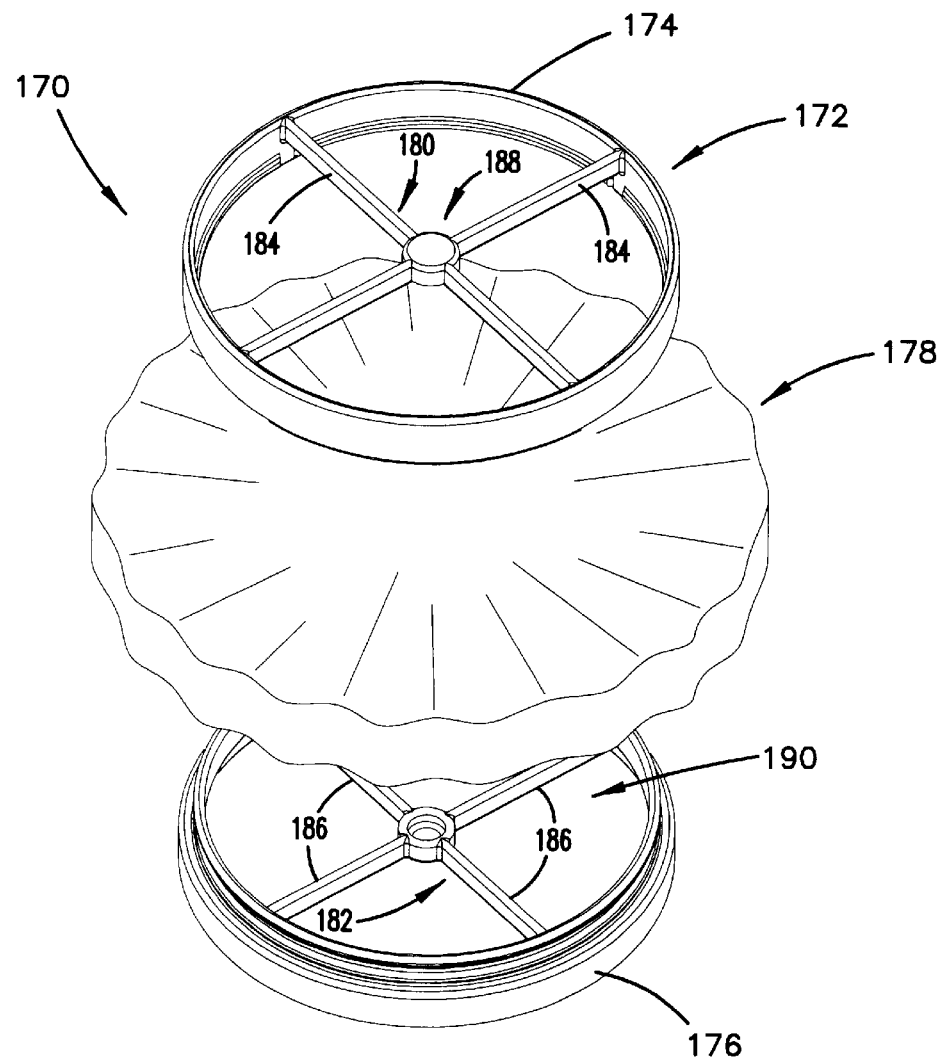
FIG. 6 is an exploded, perspective view of another embodiment of a filter element, according to principles of the disclosure.

Attention is directed to FIG. 6. In FIG. 6 an alternate embodiment of a filter element is shown generally at 170. The filter element 170 is similar to the filter element 50, and it includes some additional advantageous constructions. The filter element 170 includes a frame construction 172 which may be multiple pieces. In the embodiment shown, the frame construction 172 includes a first frame piece 174 and a second frame piece 176. Trapped between the first and second frame pieces 174 and 176 is a media construction 178.

The first and second frame pieces include structure for allowing an interlocking of the first and second frame pieces 174, 176 together with the media construction 178 trapped therebetween. As can be seen in FIG. 7, the media construction 178 is shown held by and trapped between the first and second frame pieces 174, 176, in a manner analogous to that described in conjunction with FIG. 3 above.

The embodiment of FIG. 6 differs from the embodiment of FIGS. 2–4 in that both the first and second frame pieces 174, 176 include a support construction shown at 180 and 182, respectively. The support construction 180 may include an internal framework of support braces 184. Similarly, the support construction 182 may include an internal framework of support braces 186. The braces 184, 186 provide support structure to the frame construction 172. The frame construction 172 is supported to have sufficient structural integrity to prevent the collapse under air intake pressures, that can typically range from at least 25 inches of water, and can be up to 100 inches of water.

The support constructions 180, 182 can also operate as handle constructions 188, 190. The handle constructions 188, 190 can include the braces 184, 186. Alternatively, additional structure may be attached to the frame construction 172 to allow for the convenient installation and removal of the filter element 170 from a duct, tubular construction, or housing. Because both the first and second frame pieces 174, 176 include handle constructions 188, 190, the filter element 170 is reversible. By reversible, it is meant that the filter element 170 may be installed in a duct or tubular construction with either the first frame piece 174 or the second frame piece 176 in the most upstream position (alternatively stated, the first frame piece 174 or the second frame piece 176 may be installed in the most downstream position). The media construction 178 will deflect in the proper orientation and occupy to fill the space between the periphery of the frame construction 172 and the wall of the duct in which the filter element 170 is inserted.

C. Methods of Use and Changeout

In operation, air to be cleaned passes through a tubular construction or duct 18 and toward the filter element, such as filter element 50. For example, the filter element 50 can be used in a system such as that described in FIG. 1 for an air intake system of an engine, where the filter element 50 operates as a secondary element downstream of a primary filter element 20. The gas or air, after passing through the primary filter element 20, proceeds to flow downstream as shown at arrows 150, FIG. 4. The air passes within the perimeter area 66 of the frame construction 52. Most of the air is not allowed to pass between the frame construction 52 and the inner wall 120 of the duct 18 because the media-occupied region introduces high restriction and creates the sealing effect 125 at that region. Therefore, the air is forced to pass within the perimeter area 66 of the frame construction 52. It then passes through the filtering portion 56 of the media 54. There, the media 54 removes particulates and contaminants from the air stream 150 that are larger than pores in the media 54.

After passing through the media 54, the airstream continues as shown at arrows 152. Typically, the airstream 152 will be drawn into the turbo of an engine 14. Over time, the filtering portion 56 of the media 54 will become occluded. When the media 56 becomes occluded, the filter element 50 should be serviced. In some applications, the media 54 will include a visual indicator of life. For example, the media 54 may be a certain color, such as blue, to help the user to be able to visually determine whether the media 54 is clogged and occluded and requires replacement. This can typically be while the primary air cleaner 20 is serviced.

To service the system, typically the primary air cleaner 20 will be removed from the duct 18. When the primary air cleaner 20 is being serviced, sometimes debris and particulate materials can be knocked or jarred from the primary element 20 and fall into the duct 18. The filter element 50 operates to catch this debris and contaminant and prevent these contaminants from being sucked into the engine 14.

After the primary filter element 20 has been removed, the secondary or safety filter element 50 may be serviced. The user may remove the filter element 50 from the duct 18 by breaking the sealing effect 125 formed by the media 54. More specifically, the user may grasp the handle construction 100 of the frame construction 52 and remove the element 50 from the duct 18. This may be done by grasping the ribs 102 and center framework 104 and axially pulling the filter element 50 from the duct 18 by sliding it along the inner wall 120 of the duct 18. As the filter element 50 is being slid along the inner wall 120 of the duct 18, the skirted portion 60 of the media 54 wipes the inner wall 120 to help further clean the duct 18.

After the filter element 50 is removed from the duct 18, either the entire filter element 50 can be disposed of and replaced with a new one, or alternatively, only the media 54 is disposed of while the frame construction 52 is reused. Preferably, the filter element 50 is constructed of substantially metal free materials such that it is readily incineratable. For example, preferably the filter element 50 comprises at least 95%, and more preferably 98–100% nonmetallic materials. If the entire filter element 50 is disposed of, the old filter element 50 can be incinerated.

Alternatively, the filter element 50 can be disassembled and the media 54 removed. The old filter media 54 would be disposed of, such as by incineration. The frame construction 52 could be recycled, or alternatively, re-used. If re-used, a new region of filter media 54 would be secured to the frame construction 52. For example, when disassembling the filter element 50, the first and second frame pieces 72, 74 are removed or unlocked or unsnapped from each other. A screwdriver or other suitable tool may be used to pry the first frame piece 72 from the second frame piece 74. By unlocking the first and second frame pieces 72, 74 from each other, this frees the first, old filter media 54, which may then be incinerated. The filter element 50 is then reassembled. This may be done by placing the new region of media over the end portion 112 of the second frame piece 74. The skirted portion 60 of the media should be extending outwardly from the second frame piece 74. The first frame piece 72 can then be aligned with the second frame piece 74 and snapped or locked to the second frame piece 74. Specifically, the extension 88 is pushed within the inner wall 110 of the band 106 until the bead member 80 snaps within the recessed portion 78 and traps the media 54 therebetween.

The new filter element can then be installed in the duct 18. This may be done by grasping the frame construction, such as the ribs 102 of the handle construction 100 and inserting it into the duct 18. The skirted portion 60 of the filter element becomes compressed between and against the frame construction and the inner wall of the duct to occupy or fill the volume therebetween and create a media-filled region and a sealing effect.

After the filter element 50 is replaced, the primary air cleaner or filter element 20 may also then be replaced within the duct 18.

D. Example Materials

In this section, examples are provided of usable materials. The particular choice for any given material will vary, depending on the filtering application. In other words, the particular material selected for the systems usable herein will be decided upon by the engineer based on the system requirements. A variety of materials are possible. The following section provides examples of materials that have been found to be suitable.

The frame construction 52 will be constructed of a material that will provide structural integrity and is not subject to creep. Further, the frame construction 52 can be constructed of a non-metallic material such that it is environmentally friendly and either recyclable or readily incineratable. The frame construction can be constructed from most plastics, for example, glass reinforced plastic. One usable reinforced plastic is propylene or nylon.

The media 54 will be a media that will introduce little restriction into the duct. The media can be a nonpleated, noncylindrical, nonwoven media. In particular, the media can be depth media, such as a fibrous media. One example of fibrous media usable in the system described above is as follows:

1 layer of 4.0–4.8 oz/yd$^2$ (136–163 g/m$^2$) polyester fiber depth media (mixed fibers); 0.55–0.70" (14–18 mm) thickness freestate (as measured under 0.002 psi compression); average fiber diameter about 21.0 micron (mass weighted average) or about 16.3 micron (length weighted average); permeability (minimum) 500 ft/min (152 m/min.); free state solidity about 0.6–1.0%, typically about 0.7%.

E. One Example Construction

In the following paragraphs, one example construction of a filter element 50 is described. It is understood, of course, that alternative constructions and dimensions may be utilized, based on the application and system requirements.

The frame construction 52 can be a variety of shapes. In the embodiment shown in FIGS. 2–4, the frame construction is circular. As such, the frame construction can have an overall diameter appropriate for whatever the size is of the ductwork, and typically can range between 2–12 inches. In one example, the outer diameter of the first frame piece 72 will have an outer diameter of about 2–12 inches, and in one example, is 3.7 inches. The first frame piece 72 will define an inner diameter at the uppermost rim 82 of between 2–12 inches, and in one example, is about 3.3 inches. The overall axial length of the first frame piece 72, and thus the entire frame construction 52, will be between 0.25–1 in., and in one example is about 0.6 inches.

The outer diameter of the second frame piece 74 will be between 2–12 in., and in one example is about 3.7 inches.

The axial length of the sealing effect 125 will be at least about 0.1 in., typically will be between 0.25–1 in., and in one example is 0.3 inches. The thickness of the media 54 at the skirted portion 60 when compressed between the frame construction 52 and a sealing surface of a duct will be typically between 0.03–0.12 in.

The handle construction 100 will have at least two ribs, and in one example has four ribs, spaced 90° apart from each other. The ribs 102 will intersect at a center frame member 104 that is circular, having a diameter that will range between ⅛–2 in., and one example is about 0.3 inches.

For non-circular embodiments, such as those described in FIG. 5, the overall length of the frame construction 136 across its longest extension would be between 2–15 inches, and in one example, is about 10 inches. The width of the frame construction 136 through its center between straight segments 133, 134 would be between 1–8 inches, and in one example, is about 5 inches. The length of each of the straight segments 133, 134 would be between 1–9 inches, and in one example is about 5 inches. The radius of each of the semicircular ends 131, 132 would be between 0.5–4 inches, and in one example is about 2.5 inches.

The above specification, examples and data provide a complete description of the manufacture and use of the invention. Many embodiments of the invention can be made according to the principles described herein.

We claim:

1. A filter element comprising:
   (a) a frame construction having an outer periphery;
   (b) a region of media held by said frame construction;
      (i) said region of media having a portion oriented within said frame construction to remove at least some particulates from a gas stream passing therethrough;
      (ii) said region of media including a skirted portion;
         (A) said skirted portion extending outside of said outer periphery and having a continuous outermost edge;
         (B) said skirted portion being sufficiently flexible to be foldable over said outer periphery;
      (iii) said region of media comprising non-pleated media within said outer periphery of said frame construction; and
      (iv) said frame construction comprising first and second frame pieces trapping said region of media therebetween;
         (A) said first and second frame pieces being secured together by pinching said region of media between said first frame piece and said second frame pieces;
         (B) said outermost edge of said skirted portion being loose and flexible and spaced from said outer periphery of said frame construction, when the filter element is not operably installed in a duct.

2. A filter element according to claim 1 wherein:
   (a) said region of media comprises fibrous, non-woven media having a percent solidity free-state of about 0.6–1.0%.

3. A filter element according to claim 2 wherein:
   (a) said frame construction outer periphery defines a perimeter area within said outer periphery; and
   (b) said region of media comprises fibrous media having a filtering portion and said skirted portion;
      (i) said filtering portion being oriented within said perimeter area of said frame construction; and
      (ii) said skirted portion extending outside of said perimeter area.

4. A filter element according to claim 1 wherein:
   (a) one of said first and second pieces includes a bead member, and one of said first and second pieces defines a recessed portion;
      (i) said bead member snapping into said recessed portion with said region of media compressed therebetween.

5. A filter element according to claim 1 wherein:
(a) said first and second pieces are circular in shape.

6. A filter element according to claim 1 wherein:
(a) said first and second pieces include a pair of opposite, arcuate ends joined by a pair of straight segments.

7. A filter element according to claim 3 wherein:
(a) said frame construction includes at least a single handle member.

8. A filter element according to claim 3 wherein:
(a) said frame construction includes rigid braces supporting said outer periphery.

9. An engine air flow system comprising:
(a) an engine having a rated air flow of at least 25 cfm and an air intake duct; and
(b) an air filter arrangement for cleaning air being taken into the engine; said air filter arrangement comprising:
  (i) a first filter element; and
  (ii) a removable and replaceable second filter element mounted in said air intake duct downstream of said first filter element; said second filter element including:
    (A) a region of filter media;
    (B) a frame construction holding said region of filter media, said frame construction having an outer periphery;
    (C) said region of filter media having a skirted portion; said skirted portion extending outside of said outer periphery and having a continuous outermost edge; said skirted portion being sufficiently flexible to be foldable over said outer periphery and be positioned between said air intake duct and said frame construction;
    (i) said region of media comprising non-pleated media within said frame construction;
    (ii) said frame construction comprising first and second frame pieces trapping said region of media therebetween; and
    (iii) said first and second frame pieces being secured together by pinching said region of media between said first frame piece and said second frame piece;
    (iv) said outermost edge of said skirted portion being loose and flexible and spaced from said outer periphery of said frame construction, when the filter element is not operably installed in said air intake duct.

10. A system according to claim 9 wherein:
(a) said skirted portion of said region of filter media is compressed between said air intake duct and said frame construction with a compression of about 70–90%.

11. A system according to claim 9 wherein:
(a) said region of media comprises fibrous, non-woven media having a percent solidity free-state of about 0.6–1.0%.

12. A system according to claim 9 wherein:
(a) said first and second frame pieces define an outer, annular surface;
  (i) said skirted portion of said region of media being compressed between and against said outer, annular surface and said air intake duct.

13. A system according to claim 12 wherein:
(a) said first and second frame pieces are circular with an outer periphery and a perimeter area within said outer periphery;
  (i) said region of media filling said perimeter area.

14. A system according to claim 9 wherein:
(a) said first and second frame pieces comprise a plastic material; and
(b) said first and second frame pieces are race-track shaped.

15. A method of servicing an air cleaner having an outlet duct; the method comprising:
(a) providing a filter element having a frame construction with an outer periphery; a region of media held by the frame construction; the region of media having a portion oriented within the frame construction; the region of media including a skirted portion; the skirted portion extending outside of the outer periphery and having a continuous outermost edge; the outermost edge of the skirted portion being loose and flexible and spaced from the outer periphery of the frame construction, when the filter element is not operably installed in the outlet duct;
  (i) the region of media comprising non-pleated media within the frame construction;
  (ii) the frame construction comprising first and second frame pieces trapping the region of media therebetween;
  (iii) the first and second frame pieces being secured together by pinching the region of media between the first frame piece and the second frame piece; and
(b) positioning, within the outlet duct, the filter element to orient the skirted portion between an interior wall of the air intake duct and the frame construction.

16. A method of servicing according to claim 15 further including:
(a) removing the filter element by grasping the frame construction and axially sliding the filter element along the interior wall of the duct.

17. A method of servicing according to claim 16 further including:
(a) disposing of the filter element; and
(b) inserting a second filter element into the duct; the second filter element having a region of media held by a frame construction; the region of media including a skirted portion outside of the frame construction; and
(c) positioning the skirted portion of the second filter element between the frame construction and the interior wall of the duct.

18. A method of servicing according to claim 16 further including:
(a) removing the filter media from the frame construction; and
(b) securing a new region of filter media in the frame construction.

* * * * *

UNITED STATES PATENT AND TRADEMARK OFFICE
CERTIFICATE OF CORRECTION

PATENT NO. : 6,221,122 B1  
DATED : April 24, 2001  
INVENTOR(S) : Gieseke et al.

Page 1 of 1

It is certified that error appears in the above-identified patent and that said Letters Patent is hereby corrected as shown below:

<u>Column 10,</u>  
Line 42, delete "pieces" and insert -- piece --.

Signed and Sealed this

Sixteenth Day of April, 2002

Attest:

JAMES E. ROGAN  
*Director of the United States Patent and Trademark Office*

*Attesting Officer*